(12) United States Patent
Subtil et al.

(10) Patent No.: US 12,347,018 B2
(45) Date of Patent: *Jul. 1, 2025

(54) FINE GRAINED INTERLEAVED RENDERING APPLICATIONS IN PATH TRACING

(71) Applicant: Nvidia Corporation, Santa Clara, CA (US)

(72) Inventors: Nuno Raposo Subtil, Santa Clara, CA (US); Manuel Kraemer, Santa Cara, CA (US); Alexey Panteleev, Santa Clara, CA (US); Mike Songy, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,703

(22) Filed: Mar. 1, 2022

(65) Prior Publication Data

US 2022/0292758 A1 Sep. 15, 2022

Related U.S. Application Data

(63) Continuation of application No. 16/881,333, filed on May 22, 2020, now Pat. No. 11,270,496.

(60) Provisional application No. 62/852,917, filed on May 24, 2019.

(51) Int. Cl.
*G06T 15/06* (2011.01)
*G06T 3/40* (2006.01)
*G06T 15/00* (2011.01)

(52) U.S. Cl.
CPC ............... *G06T 15/06* (2013.01); *G06T 3/40* (2013.01); *G06T 15/005* (2013.01)

(58) Field of Classification Search
CPC .......... G06T 15/06; G06T 3/40; G06T 15/005
See application file for complete search history.

(56) References Cited

U.S. PATENT DOCUMENTS

| | | | |
|---|---|---|---|
| 2006/0072831 A1* | 4/2006 | Pallister | H04N 21/43615 375/E7.103 |
| 2010/0134505 A1 | 6/2010 | Andersen | |
| 2011/0164110 A1 | 7/2011 | Fortin et al. | |
| 2013/0038618 A1 | 2/2013 | Urbach | |
| 2014/0247365 A1 | 9/2014 | Gardner et al. | |
| 2014/0285499 A1 | 9/2014 | Iwasaki | |
| 2014/0347359 A1* | 11/2014 | Gruen | G06T 15/503 345/426 |
| 2015/0287233 A1 | 10/2015 | Shin et al. | |
| 2017/0109920 A1* | 4/2017 | Jung | G06T 15/80 |
| 2017/0154129 A1* | 6/2017 | Fainberg | G06F 30/00 |

(Continued)

*Primary Examiner* — Maurice L. McDowell, Jr.

(57) ABSTRACT

The disclosure provides a rendering system and a rendering method that split the pixels of a full frame into partial image fields and process those image fields individually in parallel. In one example, the rendering system includes: (1) an interface configured to receive a full frame, and (2) one or more processors, coupled to the interface, that split the full frame into a plurality of partial image fields, each of the partial image fields corresponding to different pixels of the full frame, process the partial image fields in parallel; and render the full frame using the processed partial image fields. The partial image fields are processed by ray tracing each of the partial image fields using a different type of ray in parallel.

20 Claims, 6 Drawing Sheets

(56) References Cited

U.S. PATENT DOCUMENTS

2017/0365087 A1   12/2017  Wald et al.
2018/0357809 A1*  12/2018  Lawless ................ G06T 3/0093
2019/0057539 A1*   2/2019  Stanard ................ G06T 17/005

* cited by examiner

FIG. 3B

FINE GRAINED INTERLEAVED RENDERING APPLICATIONS IN PATH TRACING

CROSS-REFERENCE TO RELATED APPLICATION

This application is a continuation application of U.S. patent application Ser. No. 16/881,333 filed by Nuno Raposo Subtil, et al. on May 22, 2020, entitled "FINE GRAINED INTERLEAVED RENDERING APPLICATIONS IN PATH TRACING", which claims the benefit of U.S. Provisional Application Ser. No. 62/852,917, filed by Nuno Raposo Subtil on May 24, 2019, entitled "FINE GRAINED INTERLEAVED RENDERING APPLICATIONS IN PATH TRACING." Both of the aforementioned applications are commonly assigned with this application and incorporated herein by reference.

TECHNICAL FIELD

This application is directed, in general, to rendering and, more specifically, to rendering an image using ray-tracing.

BACKGROUND

Many computer graphic images are created by generating a two-dimensional (2D) image of a three-dimensional (3D) scene from a given viewpoint. This process, called "rendering," typically includes using mathematical models of the scene, which may include information on geometry, lighting, shading, physics, motion, and texture information. As the demand for computer graphics, and in particular the demand for real-time computer graphics, has increased, computer systems adapted to accelerate the rendering process have become widespread. In such systems, an application running on a central processing unit (CPU) performs high-level operations, such as determining the position, motion, and collision of objects and particles in a given scene. From these high-level operations, the application, such as a video game, generates a set of rendering commands and data defining the desired rendered image or scene. For example, rendering commands and data can define scene geometry, lighting, shading, texturing, motion, and/or camera parameters for a scene. A graphics processing system employing graphics processing units (GPUs) then creates one or more rendered scenes from the set of rendering commands and data. Rasterization is an example of a traditional technique that is used in a pipeline for rendering scenes.

SUMMARY

In one aspect, the disclosure provides a method of rendering a frame. In one example, the method includes: (1) splitting a full frame into a plurality of partial image fields, each of the partial image fields corresponding to different pixels of the full frame; (2) processing the partial image fields in parallel; (3) rendering the full frame using the processed partial image fields.

In another aspect, the disclosure provides a graphics processing system. In one example, the system includes: one or more processors that: (1) split a full frame into a plurality of partial image fields, each of the partial image fields corresponding to different pixels of the full frame; (2) process the partial image fields in parallel; and (3) render the full frame using the processed partial image fields.

In yet another aspect, the disclosure provides a computer program product. In one example, the computer program product has a series of operating instructions stored on a non-transitory computer-readable medium that directs a data processing apparatus when executed thereby to perform operations including: (1) splitting a full frame into a plurality of partial image fields, each of the partial image fields corresponding to different pixels of the full frame, (2) processing the partial image fields in parallel by ray tracing each of the partial image fields using a different type of ray, and (3) rendering the full frame using the processed partial image fields.

BRIEF DESCRIPTION

Reference is now made to the following descriptions taken in conjunction with the accompanying drawings, in which:

FIG. 3B illustrates an example of creating three image fields from the pixels of a full frame;

DETAILED DESCRIPTION

Ray tracing is another example of a technique used for rendering scenes in a rendering pipeline; especially when the scenes include complex lighting. Ray tracing describes any number of techniques used for efficiently resolving visibility along a straight line between any two arbitrary points in a scene, wherein the visibility information is used to resolve light transport and light interactions with materials in the scene. For example, ray tracing can extend a line, i.e., a ray, from a user's view perspective to an object within the scene, and then determining a second ray from that object to a light source or to another object of the scene. These rays can then be used to determine the amount of light hitting the objects (including indirect lighting and reflections), the angle of the light to the user's view perspective, and how the color, texture, and other object characteristics are represented to the user.

Parallelizing graphics workloads across multiple processors in a rendering pipeline can be used to increase rendering performance. For rasterization, different parallelizing approaches, such as spatially or temporally distributing the workloads, can be used. Rasterization, however, cannot be efficiently parallelized at pixel-coarse granularity. For rendering pipelines using ray tracing, parallelization of the ray tracing can be done in a more fine-grained manner compared to rasterization. After the ray tracing portion of the pipeline, however, image-space filtering is typically needed that requires all of a frame's data be available for the entire rendered image in order to produce desired results. Such image space filtering combines information about pixels in a close proximity on the image, for example, it may need access to several input pixels distributed within a 50-pixel radius around every output pixel. Some well-known parallelization techniques are based on splitting the frame into large parts or tiles, and such splitting makes some input pixels inaccessible to the image space filters unless the entire frame is combined on one processor before running the filter. The size of the frame data that needs to be transferred across all the contributing processors for this image-space filtering can easily exceed the available bandwidth, which then considerably degrades performance.

Figure 3A:
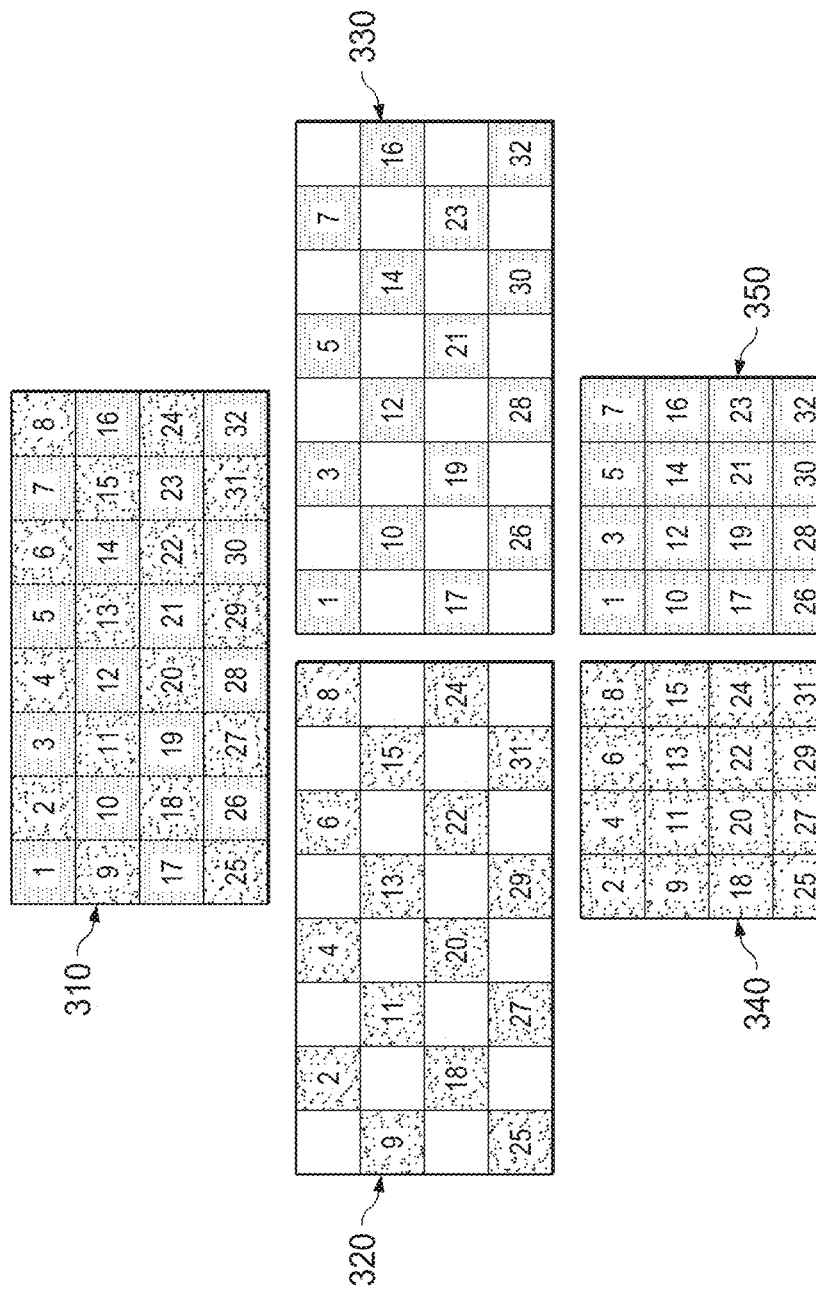
FIG. 3A illustrates examples of a full frame, partial image fields created from full frame data, and reduced-resolution images obtained by tracing rays through the partial image fields according to the principles of the disclosure.

The disclosure provides a renderer and a rendering process employing ray tracing and image-space filtering that interleaves the pixels of a frame into partial image fields and corresponding reduced-resolution images that are individually processed in parallel. The parallel processing can be performed by a single processor or by multiple processors, such as different GPUs, and is applicable to both local and remote computing. As such, the disclosed rendering can be performed by a cloud-based renderer that provides rendered frames for remote users. In parallel as used herein includes at least partially in parallel and indicates that processing is occurring in parallel paths but not necessarily simultaneously. The partial image fields can be created by separating the pixels of a frame into unique sets of interleaved pixels of the frame. The pixels of the frame can be separated into the unique interleaved sets to provide an even sampling of pixels across the full frame. For example, the pixels of each of the unique interleaved pixel sets are non-adjacent pixels of the full frame. As illustrated in FIG. 3A, the unique interleaved pixel sets of the different partial image fields can be sparse pixel grids of the full frame that include an even and odd field pattern of the pixels. When combined, all of the image fields make a full frame that includes pixel data for each position of the pixel grid of the frame.

Different processors of a graphics processing system can render reduced-resolution images by ray tracing the partial image fields. When employing two GPUs, for example, each GPU can render alternate pixels (e.g., in each row or column) of the frame. The disclosed features can also be easily extended to systems with more GPUs available for parallel processing. For example, with four GPUs, a checkerboard pattern can be implemented by rendering every 4th pixel in a 2×2 pattern per GPU, instead of an even/odd field split. A single processor can also be used to independently render reduced-resolution images and perform image-space filtering on the reduced-resolution images in parallel. Image-space filtering can include, without limitation, applying post-process filters, such as neighborhood filters, and denoising steps to rendered images.

As noted above, the approach disclosed herein allows for parallelization across the image-space filtering steps as well as the ray tracing. This differs from prior techniques that have focused on either rasterization-based approaches, or parallelizing only the ray tracing portion of the rendering pipeline. At least one other advantage provided by the disclosure is that different rays can be traced through the different partial image fields to allow separation of path-tracing workloads. For example when having two partial image fields, a reflection ray can be traced on one of the partial image fields of a frame and a refraction ray can be traced on the other one of the partial image fields of the frame. As such, shading of transmissive surfaces with both a reflective and refractive component (e.g., glass or water), can be done with only a single ray/light-path being traced for each pixel of the full frame. Other types of rays can be traced through additional partial image fields of the frame. For example, a third ray for a surface (e.g., dirty water) can be traced through yet another different partial image field of the frame having the glass and water. Using only a single ray (or a few rays) for ray tracing through each pixel of a frame is advantageous over current processes where, for example, reflections and refractions are normally processed either with several paths per pixel (e.g., offline path tracers) or perhaps with multiple denoisers that would process both reflected and refracted surfaces as separate channels. With the disclosed approach, one set of full-resolution denoisers can be used to render high-quality reflections and refractions with, for example, effectively half the resolution on each effect with minimum modifications to the denoisers. A minimum modification can be setting a screen space boundary for the spatial filters.

Figure 1:
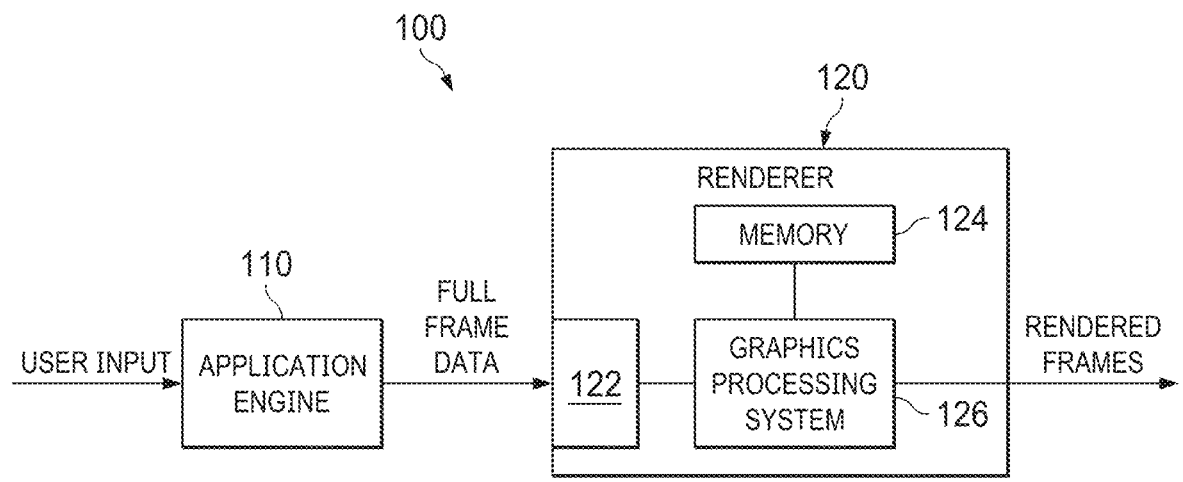
FIG. 1 illustrates a block diagram of an example of a computing system constructed according to the principles of the disclosure.

FIG. 1 illustrates a block diagram of an example of a computing system 100 constructed according to the principles of the disclosure. The computing system 100 is configured to render images from rendering commands and scene data. The rendered images provide scenes or frames of a scene that can be provided to a display for viewing. The computing system 100 includes an application engine 110 and a rendering engine or renderer 120. The computing system 100 can include additional components, such as an image processor that is configured to encode the rendered frames for video transmission over a communication system. The computing system 100, or at least a portion thereof, can be implemented on a single server or on multiple servers of a cloud computing platform, data center, or other server environment. The computing system 100, or at least a portion thereof, can also be implemented on a user's computing device such as a desktop or laptop computer. In some applications the application engine 110 can be on a computing device that is communicatively coupled to the renderer 120 via a communications network. The communications network can be a conventional network, such as the internet, a private network, or other type of network that allows the connected computing device to communicate with the renderer 120.

The application engine 110 includes the operating instructions that correspond to algorithms employed to generate scenes, such as a game engine providing scenes from a video game. The application engine 110 can be implemented on a processor, such as a CPU. An application or program stored on a non-transitory computer readable medium can include the operating instructions that direct the operation of a processor to generate a set of rendering commands and data defining the desired rendered scene. The rendering commands and data, collectively referred to as scene information, define scene geometry, lighting, shading, texturing, motion, and/or camera parameters for a frame. The application engine 110 can use inputs from a user to generate the scene information for a frame. The inputs can be from a client device, such as a game device.

The renderer 120 is configured to create one or more frames of rendered scenes from the set of scene information from the application engine 110. The renderer 120 includes an interface 122, a memory 124, and a graphics processing system 126. Each of the components of the renderer 120 can be communicatively coupled together via conventional connections.

The interface 122 is configured to communicate, i.e., transmit and receive, data, such as receiving scene information from the application engine 110 for rendering full frames. As such, the interface 122 include the necessary circuitry, components, firmware, software, etc., to transmit and receive data. The interface 122 can be a conventional interface associated with processors that communicate data according to different protocols, such as industry or proprietary protocols used for communicating data between computing devices. The interface 122 can be configured to communicate via a communications network when remotely located from the application engine 110, such as when the renderer 120 is a cloud-based and server-based renderer. The communications network can be a conventional communications network that also communicates via standard protocols.

The memory 124 or data storage is a non-transitory computer readable medium configured to store a series of operating instructions that correspond to algorithms employed to render the scenes. The series of operating instructions, or computer code, direct the operation of a processor or processors of the graphics processing system 126 when initiated to perform the rendering, including rendering reduced-resolution images in parallel employing ray tracing and image-space filtering of the different reduced-resolution images in parallel. The memory 124 can also store additional data for the rendering, such as the received data from the application engine 110.

The graphics processing system 126 is configured to create partial image fields from pixels of the full frame data, render reduced-resolution images of the full frame by ray tracing the different partial image fields, perform image-space filtering on the reduced-resolution images, and merge the reduced-resolution images to provide a full rendered frame. The graphics processing system 126 includes the necessary logic to communicate with the interface 122 and the memory 124 and perform the functions described herein to render scenes. The graphics processing system 126 includes at least one processor, such as a GPU or a CPU, for processing the reduced-resolution images. With a single processor, such as a GPU, the single processor is configured to perform the rendering and image-space filtering in parallel and then merge the reduced-resolution images to provide the full frame. The graphics processing system 126 can include one or more GPUs for processing of the different partial image fields, wherein each GPU operates in parallel to provide the different reduced-resolution images and perform image-space filtering. The number of partial image fields can correspond to the number of GPUs available for processing the partial image fields in parallel. In different examples discussed herein, the number of partial image fields can be two, three, or four. The renderer 120 can also include additional components typically included in a renderer.

For rendering of the reduced-resolution images, the graphics processing system 126 traces a single light path through each of the different partial image fields for generating the reduced-resolution images. One light path can be for reflections and another light path can be for refractions. Additionally, the graphics processing system 126 is configured to independently apply image-space filters, such as neighborhood filters, and denoising operations on each of the reduced-resolution images after the ray tracing and before the reduced-resolution images are merged. Regardless if one or multiple processors are used, the image-space filtering can be independently applied to each of the reduced-resolution images in parallel. When using multiple GPUs, the image-space filtering can be done independently across the GPUs without having full image data available. This reduces the amount of frame data that has to be communicated between the GPUs and therefore reduces the amount of bandwidth needed between the different GPUs. The graphics processing system 126 can include multiple processors, such as the graphics processing system of FIG. 2.

Figure 2:
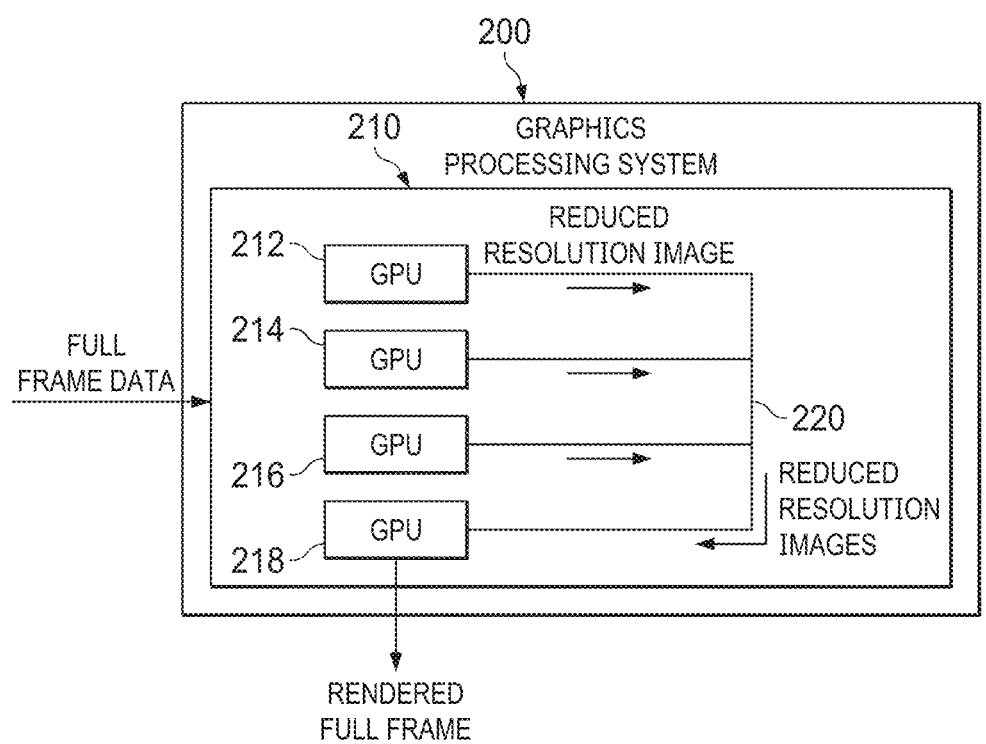
FIG. 2 illustrates a block diagram of an example of a graphics processing system constructed according to the principles of the disclosure.

FIG. 2 illustrates a block diagram of an example of a graphics processing system 200 constructed according to the principles of the disclosure. The graphics processing system 200 is configured to render reduced-resolution images of a full frame in parallel by ray tracing different partial image fields created from the full frame, perform image-space filtering on each of the reduced-resolution images in parallel, and merge the reduced-resolution images to provide a full rendered frame. The graphics processing system 200 includes multiple processors, collectively referred to as processors 210, coupled together via connectors 220. One of the processors 210, such as a GPU or a CPU, can be designated as a master device to perform the merging, such as interleaving, of the reduced-resolution images. A blur filter can be used for the merging. A combination of spatial and temporal filtering can also be used for the merging. The other ones of the processors 210 can send their reduced-resolution image to the master device for the merging over the connectors 220. Performing the image-space filtering on each of the different partial image fields reduces the data transfer that is needed over the connectors 220 between the processors 210. By transferring only the filtered interleaved images, the data transfer overhead is minimized when compared to existing parallelization techniques. As such, the bandwidth needed between the processors 210 can be reduced.

The connectors 220 can be conventional connections that are employed to communicatively couple multiple processors. The connectors 220 can be part of a communications interface configured to allow parallel operation of the multiple processors 210 in, for example, real-time ray tracing. The connectors 220 can be part of a scalable link interface (SLI) available from Nvidia Corporation of Santa Clara, California.

In FIG. 2, the processors 210 include four GPUs that are individually denoted as GPU 212, GPU 214, GPU 216, and GPU 218. GPU 218 is denoted as the master device. With multiple GPUs, each of the multiple GPUs can be configured to render a reduced-resolution image in parallel. Additional image-space filtering, such as spatial filtering and denoising operations, can then be performed in parallel for the reduced-resolution images by the particular associated GPU. For example, GPU 212, GPU 214, GPU 216, and GPU 218 can each trace rays through a different partial image field of a frame to render a reduced-resolution image. GPU 212, GPU 214, GPU 216, and GPU 218 can then perform image-space filtering on the reduced-resolution images that each of the processors 210 rendered. The reduced-resolution image from GPU 212, GPU 214, and GPU 216 can then be sent to GPU 218 via the connectors 220 for merging with the reduced-resolution image rendered and image-space filtered by GPU 218. GPU 218 merges the four reduced-resolution images to generate the full rendered frame.

Though multiple processors 210 are used in FIG. 2, the split light-path rendering technique disclosed herein is also useful for single processor applications, where a single device processes the different partial image fields. The advantage with even employing a single device corresponds to improved image-space filtering, such as denoising results from continuous surfaces, given that only a single path is traced for each pixel of the full frame. As such, a single GPU can separate the pixels of a full frame into a unique set of interleaved pixels that are processed individually, and then merged to generate the full rendered frame. While FIG. 2 illustrates that four GPUs can be used in parallel, FIG. 3A provides an example of sparse pixel grids that can be employed with two processors.

FIG. 3A illustrates examples of a full frame and two partial image fields created from full frame data according to the principles of the disclosure. The unique interleaved pixel sets can be processed in parallel and then merged, such as by a designated master device, to create a final rendered frame. FIG. 3A includes a full frame 310, a first partial image field 320 of the full frame 310, and a second partial image field 330 of the full frame 310. FIG. 3A further includes reduced-resolution images 340 and 350 that are created from the partial image fields 320 and 330. A processor of a graphics processing system can separate the pixels of the full frame 310 to generate the partial image fields 320 and 330. The partial image fields 320 and 330 can then be processed in parallel by one or more processors to render the reduced-resolution images 340 and 350. For example, GPU 212 can render reduced-resolution image 340 and GPU 218 can render reduced-resolution image 350.

The full frame 310 includes 32 pixels as indicated by the numbers. The odd numbered pixels and the even numbered pixels of the full frame 310 are also identified by different shading in FIG. 3A. The pixels of the full frame 310 are separated into the first and second partial image field 320, 330, that each include a unique set of interleaved pixels of the full frame 310. In this example, partial image field 320 includes the unique pixel set of the even numbered pixels and partial image field 330 includes the unit pixel set of the odd numbered pixels.

In one or more embodiments, the partial image fields 320, 330, are interleaved with spaces between the even or odd pixels that resemble a checkerboard. Such an embodiment is well-suited for systems with two parallel processing units, for example. According to other embodiments, the partial image fields 320, 330 may be interleaved according to other configurations, corresponding to a number of available parallel processing units within an integrated computing system. The partial image fields 320, 330, include an even representation of the pixels across the full frame 310. Creating the partial image fields 320, 330, allows separating the path-tracing workloads of the full frame. For instance considering the even and odd pattern as illustrated in FIG. 3A, even pixels can be used to follow one light path (e.g. reflection) and odd pixels can be used to follow another one (e.g. refraction) to render the reduced-resolution images 340, 350. As a result, the two checkerboard fields can be denoised independently because the resulting reduced-resolution images 340, 350, are continuous that allows neighborhood spatial filters to see the same surface and effectively average lighting information across a continuous set of pixels. A direction of the light paths through the partial image fields 320, 330, can be based on the sample direction from the pixel index of the full frame 310.

Figure 3B:
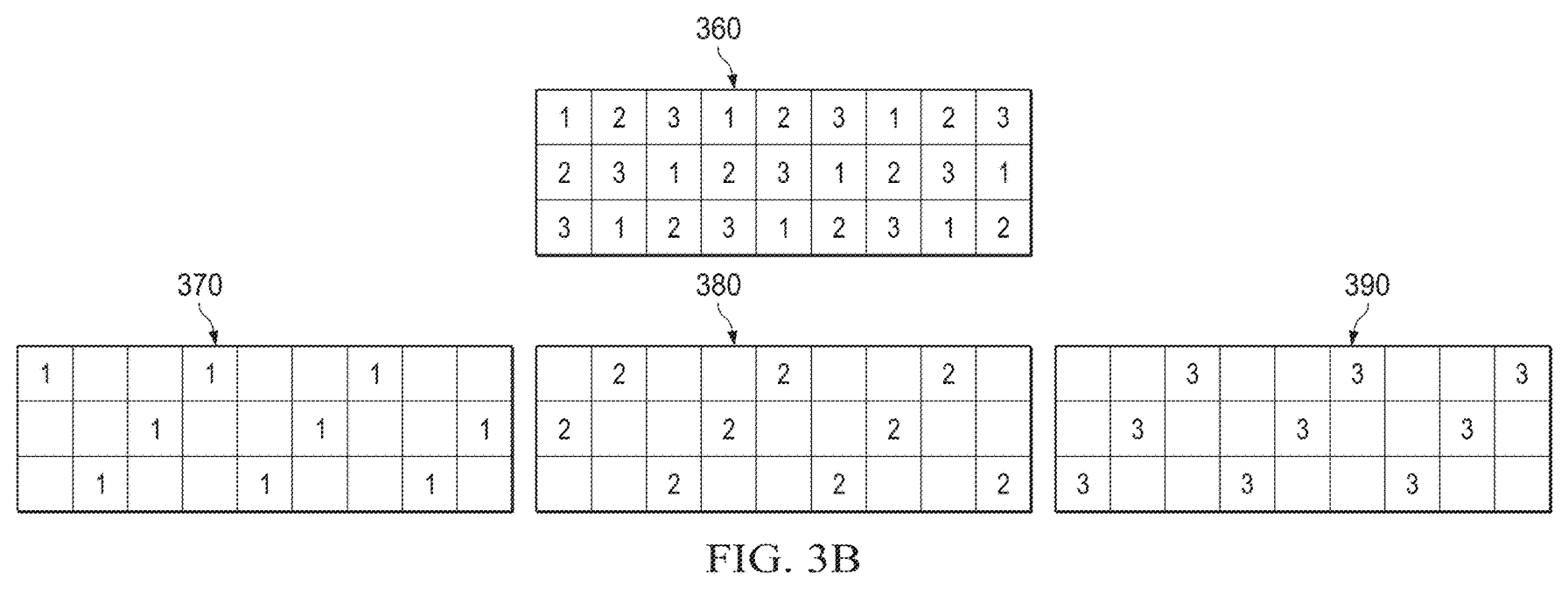

The reduced-resolution images 340, 350, are compressed such that the interleaved pixels of the partial image fields 320, 330, are contiguous. In this example, the partial image fields 320, 330, are compressed horizontally into dense half-frames to form the reduced-resolution images 340, 350, having a reduced resolution along one axis. In other examples, the partial image fields 320, 330, can be compressed vertically. The partial image fields 320, 330, can be compressed by removing the interleaved spaces. More than two partial image fields can be created from the pixels of the full frame 310. For example, every third or fourth pixel of the full frame 310 can be used to create three or four partial image fields and the resulting reduced-resolution images can be compressed along more than one axis. FIG. 3B provides an example of creating three image fields from the pixels of a full frame 360. The pixels of the full frame 360 have been identified as first (1), second (2), and third (3) pixels. Partial image field 370 includes each of the first pixels, partial image field 380 includes each of the second pixels, and partial image field 390 includes each of the third pixels. Each of the partial image fields 370, 380, 390, can be compressed horizontally by removing the interleaved spaces to create reduced-resolution images.

Even though the pixels are not adjacent in the partial image fields 320, 330, the pixels are laid out contiguously in the image space of the reduced-resolution images 340, 350. As such, image-space filtering, such as neighborhood filters and denoising operations, can be applied independently to each of the reduced-resolution images since each surface is a continuous image, albeit with a reduced resolution along at least one axis. With multiple GPUs, such as GPU 212 and 218, each GPU can apply the image-space filtering to their respective reduced-resolution image. For example, GPU 212 can process the reduced-resolution image 340 and GPU 218 can process the reduced-resolution image 350. Regardless of the number of GPUs employed, the interleaved output of each contributing GPU is merged in order to reconstruct the final, full resolution result, i.e., the full rendered frame. With multiple GPUs, one of the GPUs, such as GPU 218, can be designated as a master device that receives a copy of the reduced-resolution image(s) from the other GPU(s) that then merges the images to generate the full rendered frame. A filter can be used when merging the reduced-resolution images 340, 350, to reconstruct the full frame 310. For example, the checkerboard pattern can be discarded, and the half-frames can be re-interleaved into the final rendered image with a simple cross-shaped blur filter. A Fresnel factor or other surface parameters can be used for scaling the blending of the reduced-resolution images 340, 350.

Merging the reduced-resolution images 340, 350, can vary depending on the complexity of a scene. For example, if a scene of a frame is not complex, such as when the different partial image fields 320, 330, contain the same object or surface, then the reduced-resolution images 340, 350, can be combined to produce the full rendered frame. If a scene is complex, such as when multiple objects are present in the different partial image fields 320, 330, complex filters can be used for merging the reduced-resolution images 340, 350. The complex filters can be spatial, temporal, or a combination of spatial and temporal filters. For the combination of spatial and temporal filtering, two or more consecutive frames can be rendered, and the results stored and then used for merging. Using FIG. 3A as an example, full frame 310 can be rendered using partial image fields 320 and 330 and resulting reduced-resolution images 340 and 350 that are then stored. The subsequent frame (not shown) can then be rendered using partial image fields with alternate pixels. For example, for the subsequent frame, partial image field 320 can be used with odd pixels and partial image field 330 can be used with even pixels. Reduced-resolution images can then be rendered from these alternate partial image fields and blended with the stored reduced-resolution images 340, 350, to obtain the full frame 310.

Figure 4:
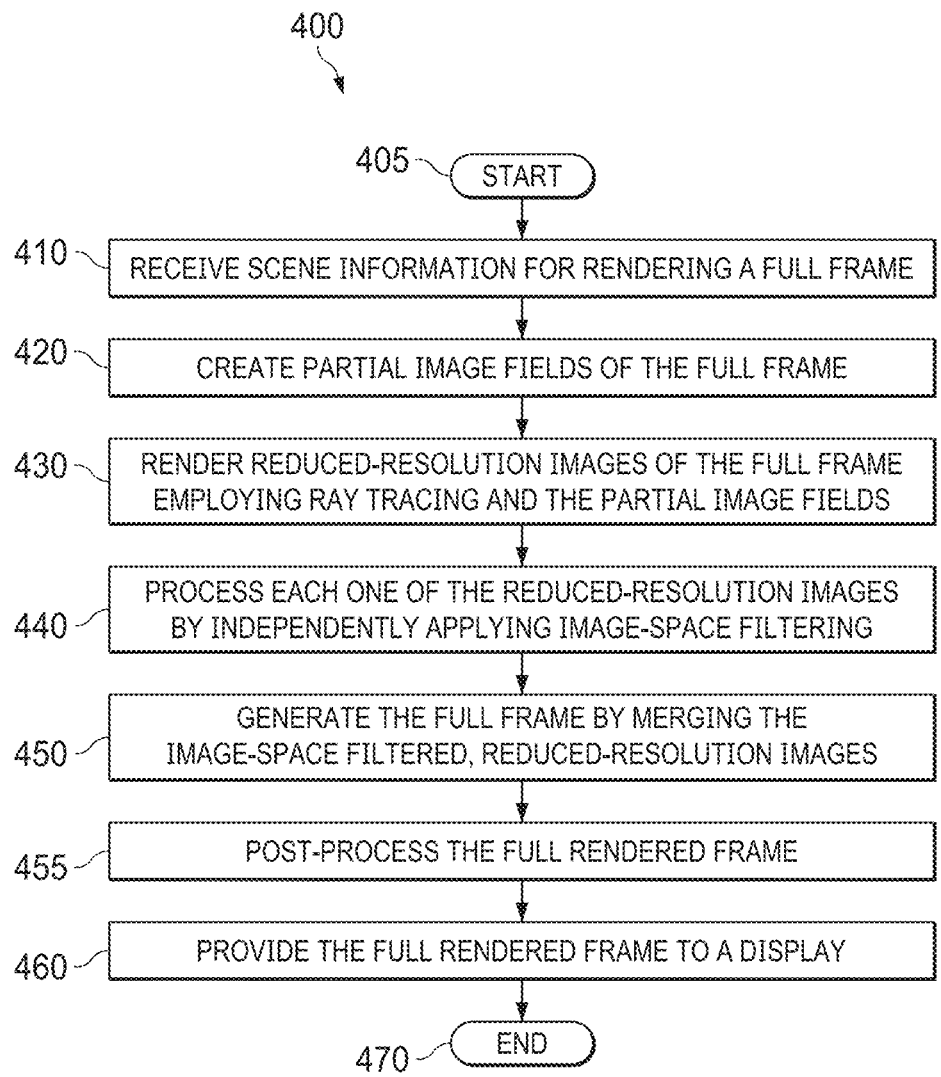
FIG. 4 illustrates a flow diagram of an example of a method of rendering employing ray tracing carried out according to the principles of the disclosure.

FIG. 4 illustrates a flow diagram of an example of a method 400 of rendering employing ray tracing carried out according to the principles of the disclosure. At least a portion of the render and the graphics processing system of FIGS. 1-2 can be employed for at least some of the steps of the method 400. The method 400 allows processing unique sets of interleaved pixels from a full frame in parallel and then merging the processed results to provide the full rendered frame. The method 400 can be performed by multiple processors or a single processor, such as multiple GPUs or a single GPU. The method 400 is for rendering a single frame and can be repeated for rendering multiple frames. The multiple frames can be combined to create a video stream. The method 400 begins in step 405.

In step 410, scene information for rendering a full frame is received. The scene information can include rendering commands and data that defines scene geometry, lighting, shading, texturing, motion, and/or camera parameters for the frame. The scene information can be received from an application engine, such as application engine 110 of FIG. 1. The application engine can be a game engine.

Partial image fields of the full frame are created in step 420. Each of the partial image fields can include a unique interleaved set of pixels from the pixels of the full frame. The pixels of the different partial image fields can provide an even sampling of the pixels across the full frame. The pixels of each of the unique interleaved pixel sets can be non-adjacent pixels of the full frame. The number of partial image fields can vary and can correspond to a number of processors designated for parallel processing of the different partial image fields.

Figure 5B:
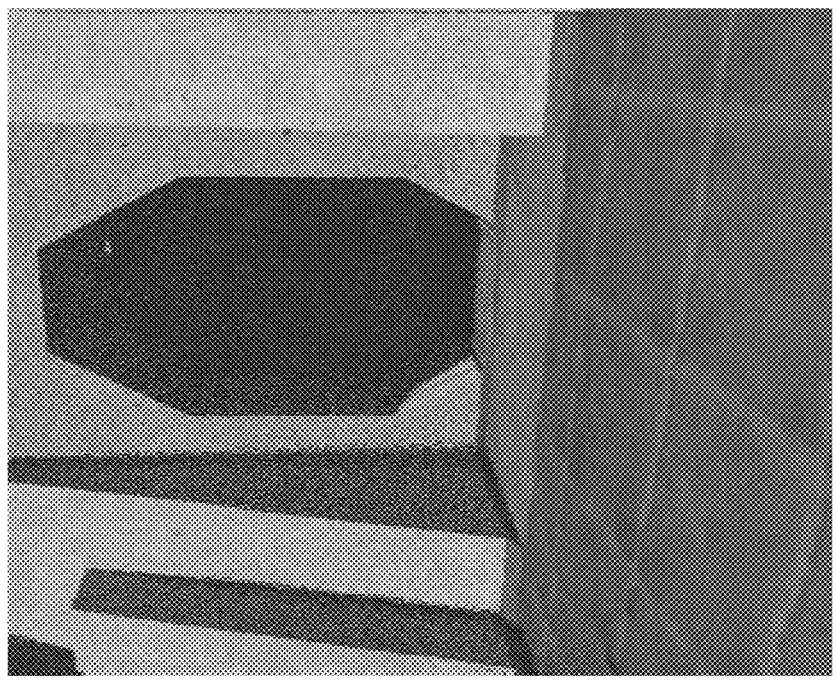
FIG. 5B illustrates an example of a reduced-resolution image, from the same full frame as FIG. 5A, created by a refraction ray.
Figure 5A:
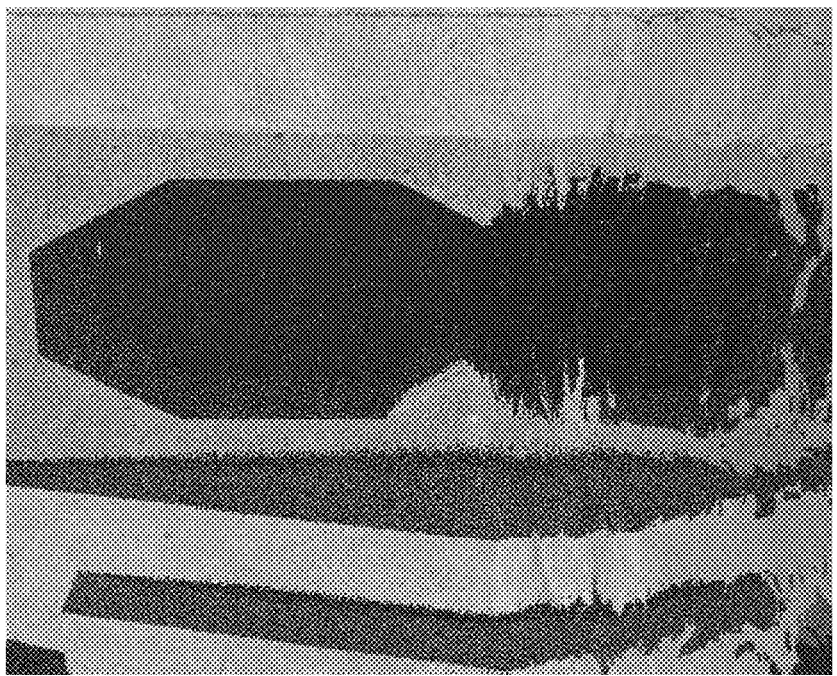
FIG. 5A illustrates an example of a reduced-resolution image created by a reflection ray.

In step 430, reduced-resolution images of the full frame are rendered in parallel by tracing light rays through the different partial image fields. A different light ray can be used for the different partial image fields. For example, a reflection ray can be used for one partial image field and a refraction ray can be used for a second partial image field. FIG. 5A provides an example of a reduced-resolution image created by a reflection ray and FIG. 5B illustrates an example of a reduced-resolution image created by a refraction ray. Both reduced-resolution images are rendered from different partial image fields of the same full frame. For example with respect to FIG. 3A, the reflection reduced-resolution image of FIG. 5A can represent the reduced-resolution image 340 from partial image field 320, and the refraction reduced-resolution image of FIG. 5B can represent the reduced-resolution image 350 from partial image field 330. Both of the images of FIG. 5A and FIG. 5B depict example output that is horizontally compressed and before image-space filtering is applied.

Image-space filtering is applied in parallel to the reduced-resolution images in step 440. The image-space filtering can include, for example, both post-process filtering and denoising steps. When multiple GPUs are employed for the ray tracing, the same GPU that rendered a reduced-resolution image is employed for the image-space filtering thereof. Conventional image-space filters can be employed on the contiguous pixels of the reduced-resolution images.

Figure 6:
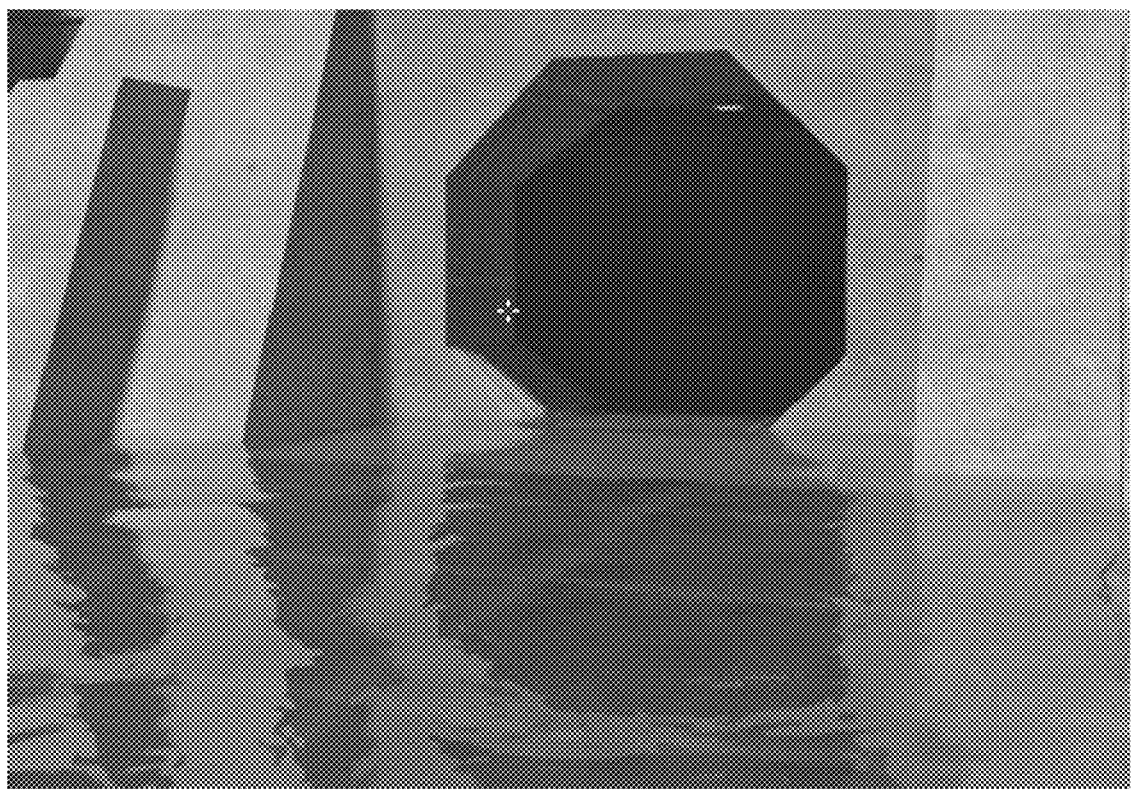
FIG. 6 illustrates an example of the reduced-resolution images of FIG. 5A and FIG. 5B being merged after image-space filtering.
Figure 7:
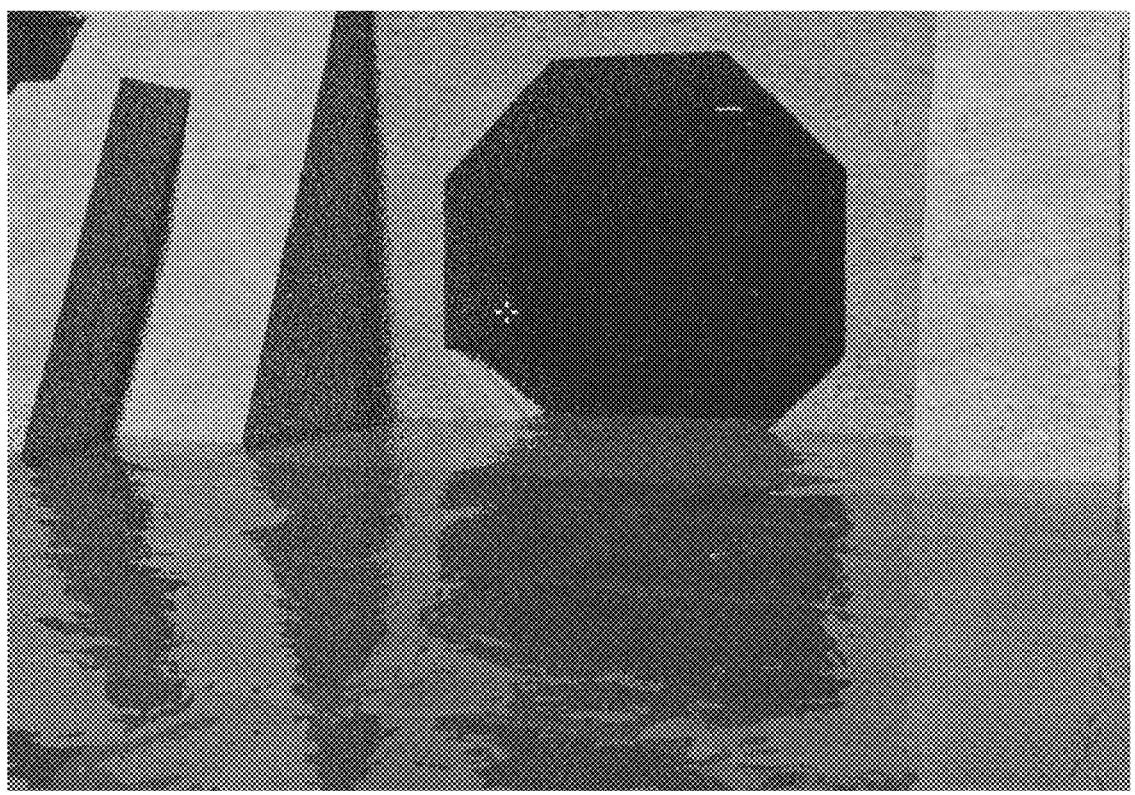
FIG. 7 illustrates the reduced-resolution images of FIG. 5A and FIG. 5B interleaved in a checkerboard pattern without the benefit of parallel image-space filtering disclosed herein.

In step 450, a rendered full frame is provided by merging the image-space filtered, reduced-resolution images. The merging can be performed by interleaving the pixels of the image-space filtered, reduced-resolution images to provide the rendered full frame. Temporal filtering, spatial filtering, or a combination of both temporal and spatial filtering can be employed for the merging. When multiple processors are employed for the rendering and image-space filtering, one of these processors can be designated for performing the merging. For example, a master device of a graphics processing system can be designated to perform the merging. FIG. 6 provides an example of the reduced-resolution images of FIG. 5A and FIG. 5B being merged after image-space filtering where denoiser outputs of the two reduced-resolution images are filtered and interleaved. In contrast, FIG. 7 illustrates the reduced-resolution images of FIG. 5A and FIG. 5B interleaved in a checkerboard pattern without the benefit of the parallel image-space filtering disclosed herein.

Post-processing of the rendered full frame is performed in step 455. For example, one or more post-processing effects can be applied to the full rendered frame, such as high dynamic range (HDR) bloom, anti-aliasing, and tone mapping. A user interface can also be added to the full rendered frame in step 455. One or more the post-processing can be optional.

In step 460, the full rendered frame is provided to a display. The display can be a display of a computer, a smart phone, a computing pad, a game device, or of another type of computing device. The display can be located proximate to or remote from the processor or processors employed to generate the full rendered frame. The full rendered frame can be sent from a cloud-based renderer to the display (or displays) via a communications network. The method 400 ends in a step 470.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. The processors or computers can be part of GPU racks located in a data center. The GPU racks can be high-density (HD) GPU racks that include high performance GPU compute nodes and storage nodes.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

The invention claimed is:

1. A method of rendering a frame comprising:
creating a plurality of partial image fields of a full frame using scene information for rendering the full frame, each of the partial image fields corresponding to different pixels of the full frame;
rendering the partial image fields at least partially in parallel, wherein the rendering includes performing one or more ray tracing operations for a first one of the partial image fields using a first type of ray and performing one or more ray tracing operations for a second one of the partial image fields using a second type of ray that is different than the first type of ray;
compressing each of the rendered partial image fields along at least one axis;
image-space filtering each of the rendered partial image fields independently and at least partially in parallel after the compressing; and
generating the full frame using the filtered partial image fields.

2. The method of claim 1, wherein the rendering includes performing the one or more ray tracing operations for each of the partial image fields using a different type of ray.

3. The method as recited in claim 1, wherein the first type of ray and the second type of ray include a reflection ray and a refraction ray.

4. The method of claim 1, wherein the image-space filtering is denoising.

5. The method of claim 1, wherein each of the partial image fields is rendered using a different processor.

6. The method of claim 1, wherein a single light path is ray-traced for each of the different pixels.

7. The method of claim 1, wherein a number of the partial image fields corresponds to a number of processors operating at least partially in parallel for the rendering.

8. The method of claim 1, wherein the different pixels are non-adjacent pixels of the full frame.

9. The method of claim 1, wherein the generating includes applying at least one of: a blur filter, a spatial filter or a temporal filter.

10. A graphics processing system, comprising:
one or more processors that:
create a plurality of partial image fields of a full frame using scene information for rendering the full frame, each of the partial image fields corresponding to different pixels of the full frame;
render the partial image fields at least partially in parallel, wherein the rendering includes performing one or more ray tracing operations for a first one of the partial image fields using a first type of ray and performing one or more ray tracing operations for a second one of the partial image fields using a second type of ray that is different than the first type of ray;
compress each of the rendered partial image fields along at least one axis such that pixels of each of the processed partial image fields are contiguous;
apply image-space filtering to each of the rendered and compressed partial image fields independently and at least partially in parallel; and
generate the full frame using the filtered partial image fields.

11. The system of claim 10 further includes an interface circuitry that receives the full frame.

12. The system of claim 10, wherein the rendering includes performing the one or more ray tracing operations for each of the partial image fields using a different type of ray.

13. The system of claim 10, wherein the first type of ray is a reflection ray and the second type of ray is a refraction ray.

14. The system of claim 10, wherein the one or more processors includes multiple processors, and each of the partial image fields is rendered using a different processor of the multiple processors.

15. The system of claim 14, wherein the image-space filtering is denoising.

16. The system of claim 10, wherein the one or more processors generates the full frame employing at least one of: a blur filter, a spatial filter or a temporal filter.

17. The system of claim 10, wherein a single light path is ray-traced for each of the different pixels.

18. The system of claim 10, wherein the different pixels are unmodified pixels of the full frame.

19. A computer program product having a series of operating instructions stored on a non-transitory computer-readable medium that directs a data processing apparatus when executed thereby to perform operations comprising:
creating a plurality of partial image fields of a full frame using scene information for rendering the full frame, each of the partial image fields corresponding to different pixels of the full frame;
rendering the partial image fields at least partially in parallel by ray tracing each of the partial image fields using a different type of ray;

compressing each of the rendered partial image fields along at least one axis;
image-space filtering each of the rendered and compressed partial image fields independently and at least partially in parallel; and
generating the full frame using the filtered partial image fields.

20. The computer program product of claim 19, wherein each of the different pixels are non-adjacent pixels of the full frame and a single light path is ray-traced for each of the different pixels.

* * * * *